US006268573B1

(12) United States Patent
Hartselle, III

(10) Patent No.: US 6,268,573 B1
(45) Date of Patent: Jul. 31, 2001

(54) POSTAL SCALE WITH LEVELING ASSEMBLY

(76) Inventor: William Hartselle, III, 15 Woodland Trail, Newnan, GA (US) 30263

( * ) Notice: Subject to any disclaimer, the term of this patent is extended or adjusted under 35 U.S.C. 154(b) by 0 days.

(21) Appl. No.: 09/374,304

(22) Filed: Aug. 16, 1999

(51) Int. Cl.$^7$ .................................................. G01G 19/56
(52) U.S. Cl. ..................... 177/148; 177/171; 177/190; 177/191; 177/245; 177/246
(58) Field of Search .................... 177/126, 127, 177/148, 171, 172, 190, 191, 201, 246, 252, 244, 245, 50; 73/1.13

(56) References Cited

U.S. PATENT DOCUMENTS

| | | | |
|---|---|---|---|
| 94,292 | * 8/1869 | Decker | 177/246 |
| 440,959 | 11/1890 | O'Marr . | |
| 594,911 | * 12/1897 | Seaman | 177/172 |
| 1,105,618 | * 8/1914 | Christianson | 177/50 |
| 1,201,063 | * 10/1916 | Litchfield | 177/245 |
| 1,921,979 | * 8/1933 | Lindsay | 73/1.13 |
| 2,284,526 | 5/1942 | Linsley . | |
| 2,335,693 | * 11/1943 | Osterberg | 177/126 |
| 2,949,287 | 8/1960 | Linsley . | |
| 2,963,286 | * 12/1960 | Fischer | 177/245 |
| 3,057,421 | 10/1962 | Fann . | |
| 3,135,344 | 6/1964 | Olyphant . | |
| 3,224,516 | 12/1965 | Stelzer . | |
| 3,786,885 | 1/1974 | Mills . | |
| 3,830,322 | 8/1974 | Mills . | |
| 4,347,905 | * 9/1982 | Berckes | 177/246 |
| 4,368,791 | 1/1983 | Jackson . | |
| 4,384,629 | * 5/1983 | Kotzin | 177/148 |
| 4,522,277 | * 6/1985 | Kotzin | 177/148 |
| 4,792,002 | 12/1988 | Ward . | |
| 4,840,241 | 6/1989 | Ishikawa . | |
| 4,961,472 | 10/1990 | Pratt . | |
| 5,696,355 | * 12/1997 | Waltho | 177/126 |
| 5,767,456 | * 6/1998 | Hartselle, III | 177/148 |

FOREIGN PATENT DOCUMENTS 586896   4/1977  (CH) .

* cited by examiner

Primary Examiner—Randy W. Gibson

(57) ABSTRACT

A portable postal scale for determining whether the weight of a letter exceeds the maximum for a given amount of postage, for example, one ounce. The scale comprises an elongated beam having a letter holder, a fulcrum, a leveling assembly and a preloaded portion and a wedge shaped piece. The letter holder comprises two upward facing arms forming a narrow slot for holding the letter to be weighed in an upright position. The leveling assembly, which allows the scale to be used on an unlevel surface, comprises a leveling bubble with scribe lines. The portion of the beam from the fulcrum to the end opposite the letter holder is the preloaded portion that has sufficient weight to balance the beam when a letter of predetermined weight is placed in the letter holding slot. In use, the end of the beam opposite the letter holder is placed on top of the wedge shaped piece, which is moved forward or backward until the leveling assembly is level. Tipping indicates that the weight of the letter is greater than the predetermined amount.

19 Claims, 2 Drawing Sheets

POSTAL SCALE WITH LEVELING ASSEMBLY

CROSS REFERENCE TO DISCLOSURE DOCUMENT

This application references Disclosure Document No. 455728 bearing a Patent & Trademark Office stamp dated May 3, 1999.

FIELD OF THE INVENTION

This invention describes a portable postal scale for determining whether the weight of a letter exceeds a predetermined amount corresponding to a given value of postage.

BACKGROUND OF THE INVENTION

Lightweight portable postal scales serve a useful function for postal patrons who do not have access in their home or work areas to more complicated platform scales available at post offices and elsewhere. In particular, a portable postal scale enables the user to determine whether the weight of a letter exceeds a maximum amount such as one ounce.

All of the prior art presents various limitations and disadvantages. Many of the devices in the prior art have multiple components that make the accuracy of a scale more difficult to achieve in the manufacturing process. Other devices require coins to balance beams; coins have varying weight tolerances themselves that again affect the accuracy of a scale. Devices that require placement of a letter horizontally at a predetermined location on a beam introduce inaccuracy to the weighting function because of variances in the center of gravity from one letter to another with equal outside dimensions and even the same total weights. Still other devices require letters being weighed to be hung over the side of a desk or other work surface. During the weighing function, these devices can fall from the desk damaging the letter or the device and making repeated weighing trials awkward. A disadvantage of other balance beam type of scales is that they do not maintain weighing accuracy when used on surfaces that are unlevel.

The present invention is provided to overcome these limitations and disadvantages.

SUMMARY OF THE INVENTION

The present invention is that for a portable postal scale employing an elongated balance beam and a wedge shaped piece, wherein the beam comprises a letter holding means, a fulcrum, a leveling assembly, a stop and a preloaded portion. The letter holding means comprises two arms extending from the top of the beam near one end which form an upward facing narrow opening or slot for holding a letter to be weighed in an upright position. The slot maintains the center of gravity of the letter at a predetermined distance from the fulcrum. The traverse fulcrum is located on the bottom of the beam The leveling assembly, comprising a leveling bubble and leveling scribe lines, is located at any convenient position along the beam. The stop extends from the bottom of the beam near a second end. The preloaded portion of the beam is that part from the fulcrum to the second end. It is given sufficient weight to balance the beam when a letter of predetermined weight is placed in the letter holding means of the opposite end.

To use the scale, a letter is placed in the slot of the letter holding means, the beam fulcrum is placed on a smooth, hard surface, the beam stop is placed on top of the wedge shaped piece and the end of the beam is held down, for example, with a finger. The wedge shaped piece is then moved forward (toward the fulcrum) or backward (away from the fulcrum) until the leveling bubble is centered within the leveling scribe lines. The scale is then released to begin the weighing function. No movement indicates that the letter weight is equal to or less than the predetermined amount. Tipping indicates that the weight is greater than the predetermined amount. By knowing the weight of a letter, the proper postage can then be determined.

DESCRIPTION OF THE PREFERRED EMBODIMENTS

Figure 1:
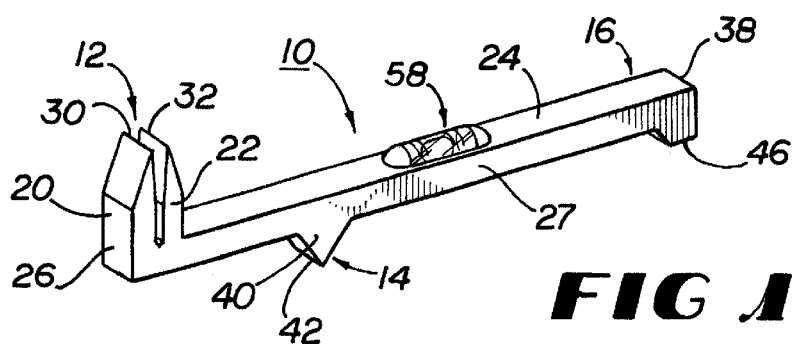
FIG. 1 is a perspective view of the balance beam portion of the preferred embodiment of the postal scale.
Figure 2:
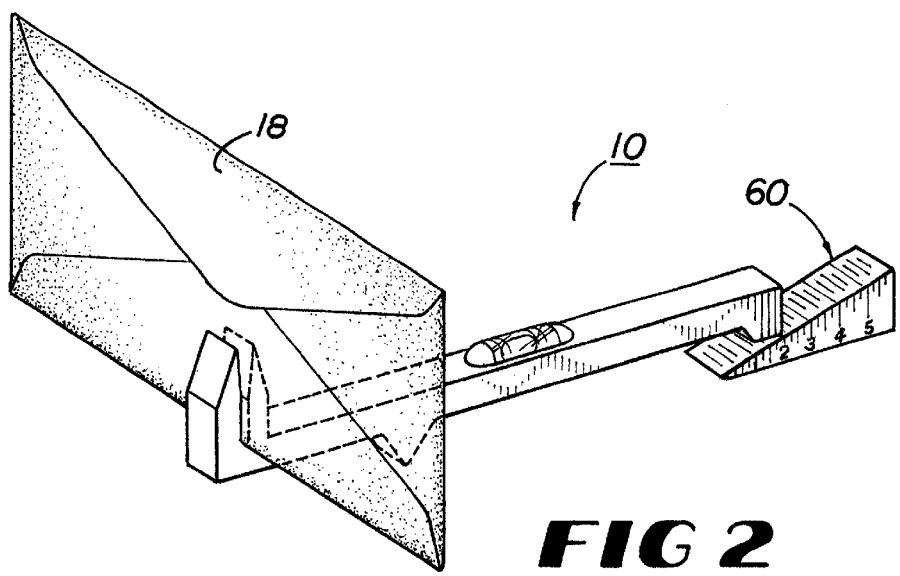
FIG. 2 is a perspective view of the postal scale comprising the balance beam of FIG. 1 and a seperate wedge shaped piece that is used to assist in leveling the beam. A letter is shown in the letter holding means in position for weighing.
Figure 3:
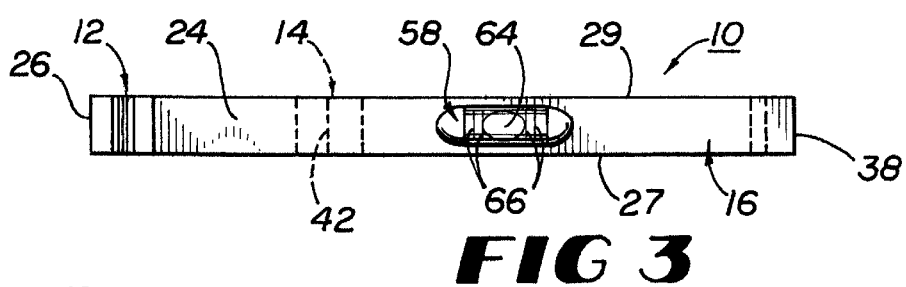
FIG. 3 is a top plan view of the beam of FIG. 1.

FIGS. 1–4 show a portable postal scale employing an elongated balance beam 10. FIG. 2 shows the beam 10, a wedge shaped piece 60 and a letter 18 held in position for weighing.

The beam 10 comprises a letter holding means 12, a fulcrum 14, a leveling assembly 58, a stop 46 and a preloaded portion 16. The letter holding means 12 comprises two upward facing arms 20 and 22 forming a narrow opening or slot therebetween. The arms extend from the top 24 of the elongated beam 10 near a first end 26. The upper portions 34 and 36 of the sides of the arms forming the slot are sloped so that thick letters can be accepted in the slot. The lower portions 84 and 86 of the sides of the slot are generally parallel and form the narrowest portion of the opening. This narrow portion accepts very thin letters while holding them vertically and accepts the thin bottom edge of thicker letters held in the upper portion of the slot. The bottom 28 of the slot formed between the arms 20 and 22 is "V" shaped to receive the bottom edge of a letter thereby centering the letter in the slot and maintaining the precise length of the moment arm from the fulcrum 14. The length of this moment arm is critical to the weighing accuracy of the scale. The two arms 20 and 22 are of equal height and have sloping tops which peak along horizontal, traverse lines 30 and 32 formed where the tops intersect sides 34 and 36 of the slot. The purpose of having arms 20 and 22 terminate in such a manner is to facilitate weighing letters that are either too wide to fit into the letter holding slot or that are too tall or flexible to stand upright in the slot. A letter such as this may still be weighed on the scale by laying it horizontally on the upper edges 30 and 32 of the arms 20 and 22 and then centering it over the slot. The letter holding means 12 can therefore accept a wide variety of letter sizes.

A fulcrum 14 located between the two ends 26 and 38 of the beam 10 extends from the bottom 25 of the beam. The fulcrum 14, which is oriented traverse to the longitudinal axis of the beam 10, comprises a body 40 having a baseline 42. The baseline 42 is that specific line on the fulcrum 14 about which the beam 10 rotates during the weighing function.

A leveling assembly 58 is located longitudinally at any position along the beam 10. For convenience of scale use, its preferred location is near the top portion of the beam 10. Locating the leveling assembly 58 in the preloaded portion 16 of the beam may be appropriate for design considerations since needed weight is added to the preloaded end. The leveling assembly 58 comprises a leveling bubble 64 and one or more matching sets of leveling scribe lines 66 as are well known to those skilled in the art. The leveling assembly 58 is considered "level" when the leveling bubble 64 is centered between a matching set of scribe lines 66. To insure accuracy of the scale, the leveling assembly 58 must be oriented such that when it is level, the slot in the letter holding means 12 between upward facing arms 20 and 22 is oriented generally vertically.

Figure 4:
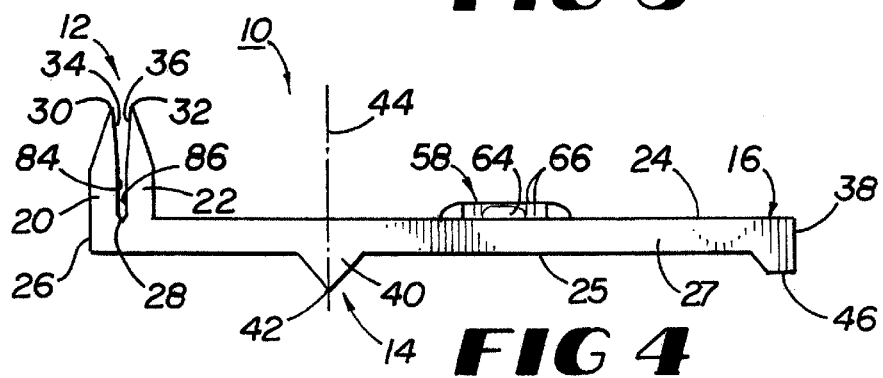
FIG. 4 is side view of the beam in FIG. 1.

In the preferred embodiment as shown in FIG. 4, a "stop" 46 extends from the bottom 25 of the beam near its end 38. When the beam is positioned level on a level working surface, the length of the stop 46 does not reach the level surface. Stop 46 is made short to permit lowering the second end 38 of the beam if needed for leveling. The advantage of the stop 46 is to position the beam generally horizontal before precise leveling is begun. Alternatively, a stop need not be used. The beam can function without it.

Also as shown in FIG. 4, the preloaded portion 16 of the beam 10 comprises that portion of the beam from a vertical plane 44 through the fulcrum baseline 42 to the second end 38 of the beam The weight of the preloaded portion 16 is sufficient to balance the beam 10 when a letter 18 of predetermined weight is placed in the letter holding means 12.

As shown in FIGS. 2, 7–9, the preferred embodiment comprises a wedge shaped piece 60 that is placed under the stop to assist in leveling. The end of the beam may be raised or lowered in small increments by moving the wedge shaped piece 60 forward (toward the fulcrum) or backward (away from the fulcrum) under the stop. Graduation marks 76, 80 and 74 indicating small increments of distance are shown on the front side 68, backside 70 and top face 72, respectively, of the wedge shaped piece. Labels 78 and 82 are provided for selected graduation marks on the front and backsides, respectively. When weighing is done repeatedly on the same work surface, these graduation marks and labels offer assistance in quickly centering the leveling bubble 64. If the beam stop is placed on a known graduation mark of the wedge shaped piece, the leveling bubble 64 should initially be centered or very close to centered within the scribe lines 66. Alternatively, the wedge shaped piece 60 is not essential for operation of the postal scale. The end 38 of the beam may be grasped between an operator's fingers, leveled by using the leveling assembly and a steady hand, and then released.

To use the scale, a letter 18 to be weighed is placed in the slot of the letter holding means as shown in FIG. 2. The beam 10 is placed on a smooth, hard surface with the "stop" resting on the top face of the wedge shaped piece 60 and the end 38 of the beam held down, for example, with a finger. The wedge shaped piece is then moved forward (toward the fulcrum) or backward (away from the fulcrum) until the leveling bubble is centered within the scribe lines. When the beam 10 is released to begin the weighing function, no pivotal movement indicates that the letter weight is equal to or less than the predetermined amount while tipping indicates that the weight is greater than the predetermined amount.

Figure 5:
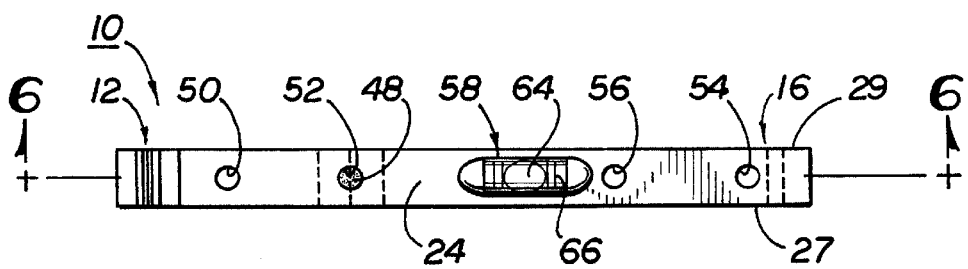
FIG. 5 is a top view of a second embodiment of the balance beam portion of the invention having longitudinally located recesses in the top surface of the beam for use with a counterweight to measure additional increments of weight.
Figure 6:
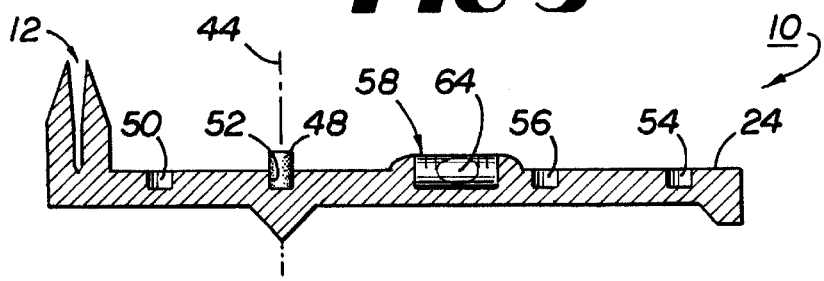
FIG. 6 is a section view of the balance beam of FIG. 5.
Figure 8:
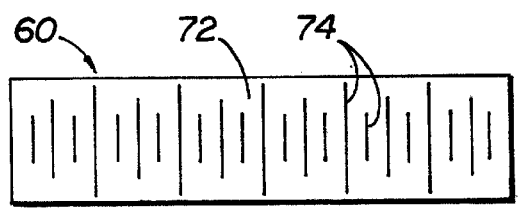
FIG. 8 is an elevation view of the back side of the wedge shaped piece shown in FIG. 2.
Figure 7:
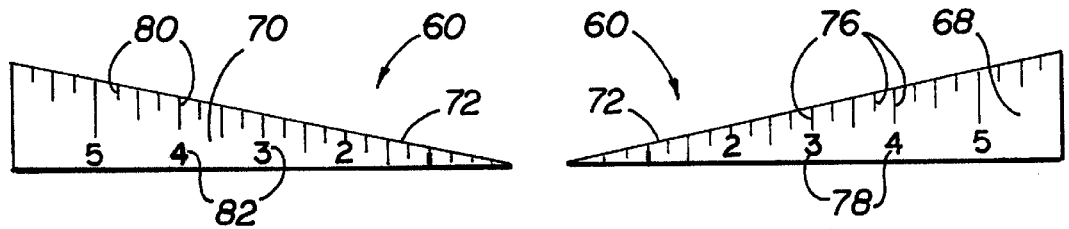
FIG. 7 is an elevated view of the front side of the wedge shaped piece shown in FIG. 2.
Figure 9:
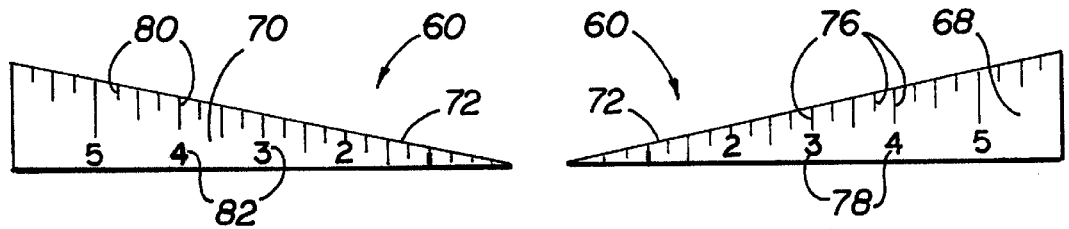
FIG. 9 is a top view of the wedge shaped piece shown in FIG. 2.

FIGS. 5 and 6 show a second embodiment of the invention wherein apertures 50, 52, 54 or 56 which are longitudinally spaced apart along the top 24 of the beam 10 are provided suitable to receive a movable and mating counterweight 48. This permits using one scale to measure several different increments of postal weight. One weight, such as one ounce, can be measured with the counterweight 48 located in the aperture 52 above the fulcrum. For larger amounts such as one and one-half and two ounces, the counterweight 48 can be placed in apertures 56 or 54, respectively, and for a lesser amount such as one-half ounce, it can be placed in aperture 50.

Figure 10:
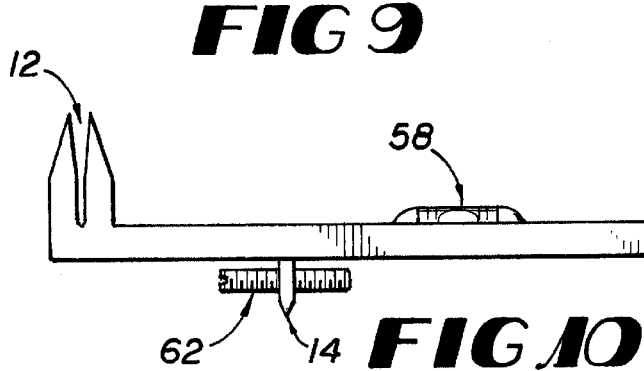
FIG. 10 is a side view of an alternate embodiment of the balance beam that incorporates a calibration means.

FIG. 10 shows a third embodiment of the invention wherein a means 62 is provided for calibration of the beam 10. An initial calibration of a new beam may be necessary, if not performed by the manufacturer, to adjust for weighing inaccuracy created by variations in the manufacturing process. In the preferred calibration embodiment, the calibration means 62 comprises a screw movable through an aperture in the fulcrum 14. To establish calibration, a known weight is placed in the letter holding means 12 and the screw is rotated in one direction or the other until the beam balances. Rotating the screw causes some of the weight of the screw to shift from one side of the fulcrum 14 to the other side thereby changing the moments about the fulcrum. A slot in the screw head permits a screwdriver to be used for turning the screw. The calibration means may be located at any position on the beam.

Although the invention is described above in terms of specific embodiments, it is not to be limited thereto but is limited only by the following claims.

What is claimed is:

1. A postal scale for determining whether the weight of a letter exceeds a predetermined amount comprising:

a. an elongated beam having a top, a bottom, a first end, a second end, a letter holding means with a slot, a fulcrum, a leveling assembly comprising a leveling bubble and leveling scribe lines and b. a generally wedge shaped piece having a top face, a front side and a back side, c. wherein said letter holding means extends above said top of said beam near said first end, d. wherein said fulcrum extends below said bottom of said beam, e. wherein said leveling assembly is oriented such that when said leveling bubble is centered within said leveling scribe lines, said letter holding slot is oriented generally vertically, f. wherein the portion of said scale from said fulcrum to said second end of said beam has sufficient weight to balance said scale when a letter of predetermined weight is placed in said letter holding and g. wherein said wedge shaped piece is dimensioned to allow said second end of said beam to rest thereon such that said beam can be leveled by moving said wedge shaped piece toward or away from said fulcrum.

2. The scale as defined in claim 1 wherein said letter holding means comprises two arms having sides forming an upward facing narrow slot.

3. The scale as defined in claim 2 wherein said arms of said letter holding means are of equal height.

4. The scale as defined in claim 2 wherein an upper portion of said sides of said slot are sloped to become closer together as they progress downward and wherein a lower portion of said sides of said slot are generally parallel.

5. The scale as defined in claim 2 wherein the bottom of said slot is "V" shaped.

6. The scale as defined in claim 1 further comprising a stop that extends below said bottom of said beam near said second end.

7. The scale as defined in claim 6 wherein when said beam is positioned on a level surface and when said leveling bubble is centered within said leveling scribe lines, the bottom of said stop is above the level surface.

8. The scale as defined in claim 1 wherein said wedge shaped piece further comprises markings on one or more of said top face, said front side and said back side that represent small increments of longitudinal distance.

9. The scale as defined in claim 1 further comprising a plurality of recesses formed in said top of said beam wherein said recesses are located at positions longitudinally along said beam and wherein said recesses are suitable for accepting a counterweight which may be removably placed in any one of said recesses.

10. The scale as defined in claim 1 further comprising a calibration means.

11. A postal scale for determining whether the weight of a letter exceeds a predetermined amount comprising:
   a. an elongated beam having a top, a bottom, a first end, a second end, a letter holding means with a slot, a fulcrum and a leveling assembly comprising a leveling bubble and leveling scribe lines,
   b. wherein said letter holding means extends above said top of said beam near said first end,
   c. wherein said fulcrum extends below said bottom of said beam and includes a fixed baseline,
   d. wherein said leveling assembly is oriented such that when said leveling bubble is centered within said leveling scribe lines, said letter holding slot is oriented generally vertically and
   e. wherein the portion of said scale from said fulcrum to said second end of said beam has sufficient weight to balance said scale when a letter of predetermined weight is placed in said letter holding slot.

12. The scale as defined in claim 11 wherein said letter holding means comprises two arms having sides forming an upward facing narrow slot.

13. The scale as defined in claim 12 wherein said arms of said letter holding means are of equal height.

14. The scale as defined in claim 12 wherein an upper portion of said sides of said slot are sloped to become closer together as they progress downward and wherein a lower portion of said sides of said slot are generally parallel.

15. The scale as defined in claim 12 wherein the bottom of said slot is "V" shaped.

16. The scale as defined in claim 11 further comprising a stop that extends below said bottom of said beam near said second end.

17. The scale as defined in claim 16 wherein when said beam is positioned on a level surface and when said leveling bubble is centered within said leveling scribe lines, the bottom of said stop is above the level surface.

18. The scale as defined in claim 11 further comprising a plurality of recesses formed in said top of said beam wherein said recesses are located at positions longitudinally along said beam and wherein said recesses are suitable for accepting a counterweight which may be removably placed in any one of said recesses.

19. The scale as defined in claim 11 further comprising a calibration means.

\* \* \* \* \*